US007558385B2

(12) United States Patent
Rayher et al.

(10) Patent No.: US 7,558,385 B2
(45) Date of Patent: Jul. 7, 2009

(54) IMPEDANCE ADAPTER FOR A HIGH-BANDWIDTH TRANSMISSION CHANNEL OF A COPPER-WIRED TERMINAL SYSTEM

(75) Inventors: Alain Rayher, Lannion (FR); Hubert Mariotte, Perros-Guirec (FR)

(73) Assignee: France Telecom, Paris (FR)

( * ) Notice: Subject to any disclaimer, the term of this patent is extended or adjusted under 35 U.S.C. 154(b) by 416 days.

(21) Appl. No.: 10/559,961

(22) PCT Filed: Jun. 3, 2004

(86) PCT No.: PCT/FR2004/001384

§ 371 (c)(1),
(2), (4) Date: May 5, 2006

(87) PCT Pub. No.: WO2004/112365

PCT Pub. Date: Dec. 23, 2004

(65) Prior Publication Data

US 2006/0245582 A1  Nov. 2, 2006

(30) Foreign Application Priority Data

Jun. 10, 2003  (EP)  .................................... 0307036

(51) Int. Cl.
*H04M 7/04* (2006.01)
*H04M 1/00* (2006.01)
*H04M 9/00* (2006.01)
(52) U.S. Cl. ...................................... 379/394; 379/398
(58) Field of Classification Search .................. 379/394, 379/398
See application file for complete search history.

(56) References Cited

U.S. PATENT DOCUMENTS

| 5,848,150 | A | 12/1998 | Bingel |
| 6,459,790 | B1 | 10/2002 | Eckert et al. |
| 6,593,826 | B2 * | 7/2003 | See ............................. 331/179 |
| 6,724,890 | B1 * | 4/2004 | Bareis .......................... 379/394 |
| 6,806,553 | B2 * | 10/2004 | Yashima et al. .............. 257/532 |
| 6,806,846 | B1 * | 10/2004 | West ........................... 343/909 |
| 6,882,237 | B2 * | 4/2005 | Singh et al. .................. 331/185 |
| 6,980,645 | B1 * | 12/2005 | Rahyer et al. ............... 379/394 |
| 2005/0232300 | A1 * | 10/2005 | Stiscia et al. ................ 370/463 |

FOREIGN PATENT DOCUMENTS

| GB | 2 339 506 A | 1/2000 |
| WO | WO 02/49333 A1 | 6/2002 |
| WO | WO 03/092234 A1 | 11/2003 |

\* cited by examiner

*Primary Examiner*—Alexander Jamal
(74) *Attorney, Agent, or Firm*—Cohen Pontani Lieberman & Pavane LLP

(57) ABSTRACT

An impedance matcher for matching the impedance of a high bit rate transmission channel of a copper-wired terminal installation comprising a high bit rate x-DSL modem (M) and a jack (P; P1; P2, P3), which automatically matches the impedance of the high bit rate transmission channel according to whether a modem is plugged into the jack of the installation or not. The impedance matcher comprises an adjustment module (10) adapted to insert a terminating impedance into the jack (P; P1, P2, P3) when it is not connected to said high bit rate modem (M), and a coupling module (20) adapted to be combined with said adjustment module (10) when said high bit rate modem (M) is connected to said jack (P; P1, P2, P3) to transform the impedance inserted into said jack to make it transparent to high bit rate transmission of broadband services.

13 Claims, 4 Drawing Sheets

IMPEDANCE ADAPTER FOR A HIGH-BANDWIDTH TRANSMISSION CHANNEL OF A COPPER-WIRED TERMINAL SYSTEM

RELATED APPLICATIONS

This is a U.S. National Phase Application under 35 USC 371 of International Application PCT/FR2004/001384, filed on 03 June 2004.

FIELD OF THE INVENTION

The present invention relates to an impedance matcher for a high bit rate transmission channel of a copper-wired terminal installation.

The field of the invention is that of high bit rate transmission and a typical application of the invention is to delivering broadband services to a copper-wired terminal installation connected to an access network.

BACKGROUND OF THE INVENTION

In the current context of increasing transmission bit rates and the explosive growth of Internet services, many broadband access systems have been made available to home users. These high bit rate access systems use existing cables, i.e. twisted-pair copper cables. High bit rates providing users with high-speed and audiovisual Internet services can be transported on existing copper pairs of an analog public switched telephone network (PSTN) or an integrated services digital network (ISDN) using x-DSL digital coding techniques. The term "x-DSL" refers to all broadband high bit rate services combining all technology families, such as HDSL, SDSL, ADSL, VDSL, ADSL-Lite, etc.

However, x-DSL systems that enable voice and data to be conveyed on the same medium must be able to adapt to different copper-wired terminal infrastructure topologies (star, bridge, or parallel line termination sections, line lengths, etc.), support all dynamic variations of transmission characteristics, and co-exist with narrowband (analog or ISDN) voice band services.

This requirement applies essentially to systems operating at very high frequencies, typically in a band above 3 MHz, for example VDSL systems, which have a very wide spectrum extending from 138 kHz to 12 MHz. The use of a transmission channel in a range of high frequencies is not without consequences in respect of the quality of the connection. In particular, transmission in the band above 3 MHz is sensitive to reflections on the line caused by open branches and/or capacitive loads.

The expression "open branch" refers to any unconnected line termination section, i.e. any unoccupied telephone jack. The expression "capacitive load" refers to any line termination section connected via a telephone jack to a narrowband terminal representing a capacitive load, for example a telephone.

In the context of international standardization, the ETSI standard includes two VDSL frequency plans, known as 997 and 998, having incompatible spectra. The first provides more room for the uplink channel and favors symmetrical high bit rates (26 Mbit/s in the downlink direction and 26 Mbit/s maximum in the uplink direction), whereas the second favors asymmetrical bit rates with a higher bit rate on the downlink channel (34 Mbit/s on the downlink channel and 4 Mbit/s maximum on the uplink channel).

The invention is described below with reference to the prior art:

FIG. 1 is a diagram of a prior art copper-wired terminal installation including a single filter;

FIG. 2 is a diagram of a prior art copper-wired terminal installation including distributed filters.

A copper-wired terminal installation (ITC) can have either of two types of configuration. It can have a "private" configuration, of "house" type, or a "collective" configuration, of "apartment block" type. The present invention applies without distinction to both configuration types.

A conventional VDSL connection comprises a multiport DSL access multiplexer (DSLAM) and a user modem that are respectively installed in the exchange and in a copper-wired terminal installation (ITC) on the user premises and are interconnected via an access network RA. The maximum line length is approximately 1 kilometer (km). In the case of an "FTTCab" architecture, the DSLAM is shifted from the exchange to a subdistribution frame and the exchange and the DSLAM are connected via optical fiber. Those architectures are known to the person skilled in the art and are not described in more detail here.

The VDSL connection must also be transparent to the telephone channel. On the user premises, the entry point of the ITC is an input terminal strip, also known as a network interface device (NID), and the filter function for separating the voice band from broadband services depends on which of the two types of installation shown in FIGS. 1 and 2 is used.

In the first case (FIG. 1 installation), the ITC comprises a splitter comprising a single filter FU at the entry point to the home, immediately after the NID. This single filter FU filters the lower portion of the spectrum. Thus the splitter separates the voice band, which is passed to narrowband terminals TBE1, TBE2, such as telephones, from broadband services, which are passed to a broadband terminal TBL, such as a computer, for example, via a high bit rate VDSL modem M in this particular example. This type of filter FU is generally a high-order (n>5) filter, which necessitates intervention of the telephone operator to install it on the user premises.

In the second case (FIG. 2 installation), the ITC comprises distributed filters FD1, FD2. These filters are passive microfilters, generally second order filters, which can be plugged into the telephone jack ahead of the narrowband terminals TBE1, TBE2. These filters prevent broadband signals interfering with telephone signals and vice-versa. They are low-cost components that are easily fitted by users themselves. However, their number cannot be increased indefinitely since their resultant impedance can compromise the return loss values, which could degrade voice quality on the telephone connection. Moreover, in the case of an ITC with distributed filters, high bit rate transmission in the 3-12 MHz band is sensitive to reflections on the line in the presence of open branches BO1, BO2 and/or capacitive loads TBE1, TBE2.

This problem could be avoided by inserting a terminating impedance into each jack to favor broadband transmission at the same time as reducing attenuation phenomena caused by mismatching of the telephone line impedance. A terminating impedance of this kind preferably has a value close to the mean value of the impedance of the copper cable of the telephone line in the frequency band from 3 to 12 MHz, that is to say a value of the order of 135 ohms (Ω). However, if a modem, for example a VDSL modem, is connected to a telephone jack of this kind into which a terminating impedance has previously been inserted, the performance of the high bit rate connection is degraded because the jack is then not transparent to the transmission of broadband services in that the value of the impedance previously inserted into it is close to that of the modem (of the order of 135 Ω in the 3-12 MHz band).

One solution to the problem of degraded high bit rate connection quality in the 3-12 MHz band caused by mismatching of the line impedance would be to match the impedance of the open branches by inserting a terminating impedance into the telephone jacks and removing the impedance previously inserted into a jack as soon as a modem is connected thereto, to prevent degrading the performance of the high bit rate connection. This solution is far from the ideal, however, as it is entirely manual and obliges the user to remember to remove an impedance previously inserted into a jack before plugging in a high bit rate modem.

SUMMARY OF THE INVENTION

Accordingly, the technical problem addressed by the present invention is that of providing a device for matching the impedance of a high bit rate transmission channel of a copper-wired terminal installation connected to an access network delivering narrowband (analog or ISDN) services and broadband (x-DSL) services, said installation comprising an x-DSL high bit rate modem and a jack; this would automatically match the impedance of the high bit rate transmission channel according to whether or not a modem is plugged into a jack of the installation, to prevent line mismatches caused by the presence of open branches and/or capacitive loads, and to prevent the problem of degraded performance of the high bit rate connection if a high bit rate modem is connected to a jack into which a terminating impedance has previously been inserted.

The solution to the stated technical problem is obtained, in accordance with the present invention, by virtue of the fact that the impedance matcher comprises:

- an adjustment module installed in said jack, consisting of an RC circuit and adapted to insert a terminating impedance into said jack when it is not connected to said high bit rate modem M;
- a coupling module adapted to be combined with said adjustment module when said high bit rate modem is connected to said jack to transform the impedance inserted into said jack to make it transparent to high bit rate transmission of broadband services.

Thus the adjustment module enables a termination impedance of finite value to be inserted into the jack. It therefore serves as a plug and protects the high bit rate connection from reflections on the line, i.e. mismatches caused by the presence of open branches and/or capacitive loads that interfere strongly with high bit rate transmission in the frequency band from 3 to 12 MHz. Moreover, when the high bit rate modem is plugged into a jack, the adjustment module and the coupling module are combined to modify the impedance of the jack in the 3-12 MHz band automatically so that the resulting impedance is an infinite impedance. The resulting impedance then has a value from 1 kΩ to 10 MΩ, for example, and is transparent to the high bit rate transmission.

The invention further consists in a copper-plated terminal installation connected to an access network carrying narrowband services and broadband services comprising jacks and a high bit rate x-DSL modem. The installation is noteworthy in that it includes impedance matchers according to the invention.

Another aspect of the invention is directed to a method of matching the impedance of a high bit rate transmission channel of a copper-wired terminal installation (ITC) connected to an access network delivering narrowband services and broadband services, said installation comprising a high bit rate modem (M) and a jack (P; P1; P2, P3). The method comprises the following steps:

an adjustment step comprising inserting a terminating impedance into said jack (P; P1, P2, P3) when it is not connected to said high bit rate modem (M); and when said high bit rate modem is connected to said jack, a coupling step comprising transforming the impedance inserted into said jack to make it transparent to high bit rate transmission of broadband services.

The remainder of the description refers to a VDSL high bit rate connection, but the invention is not limited to this type of application, of course. It applies in fact to any high bit rate connection whose frequency spectrum lies above 3 MHz.

Other features and advantages of the invention become apparent on reading the following description, which is given by way of illustrative and non-limiting example and with reference to the appended drawings, in which:

DETAILED DESCRIPTION OF THE DRAWINGS

Figure 1:
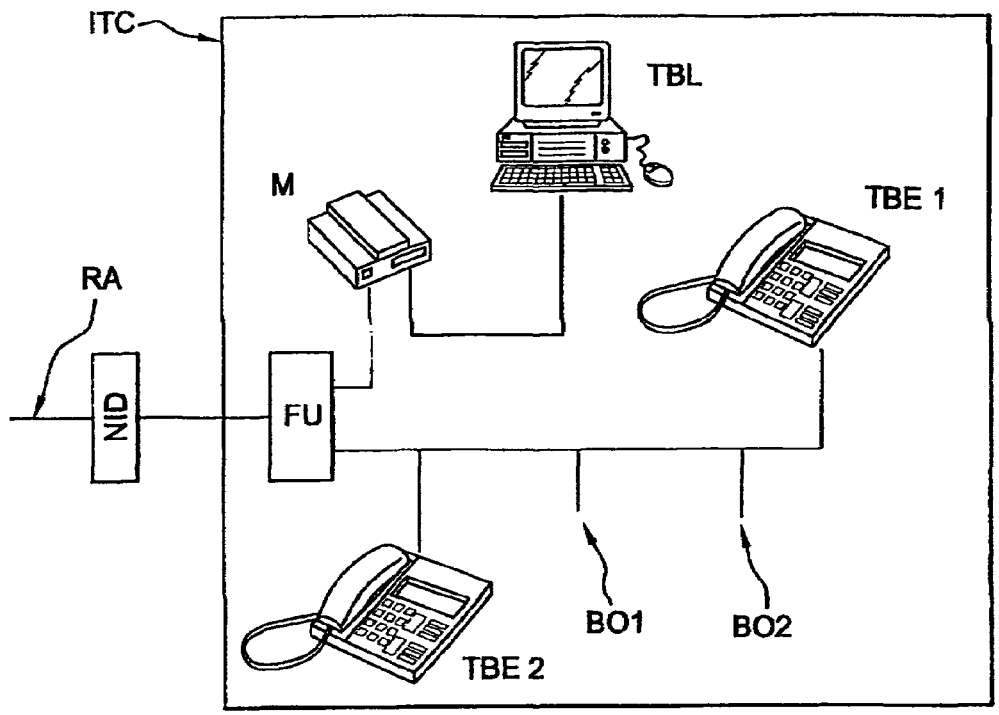
FIG. 1, already described, is a diagram of a prior art copper-wired terminal installation including a single filter.
Figure 2:
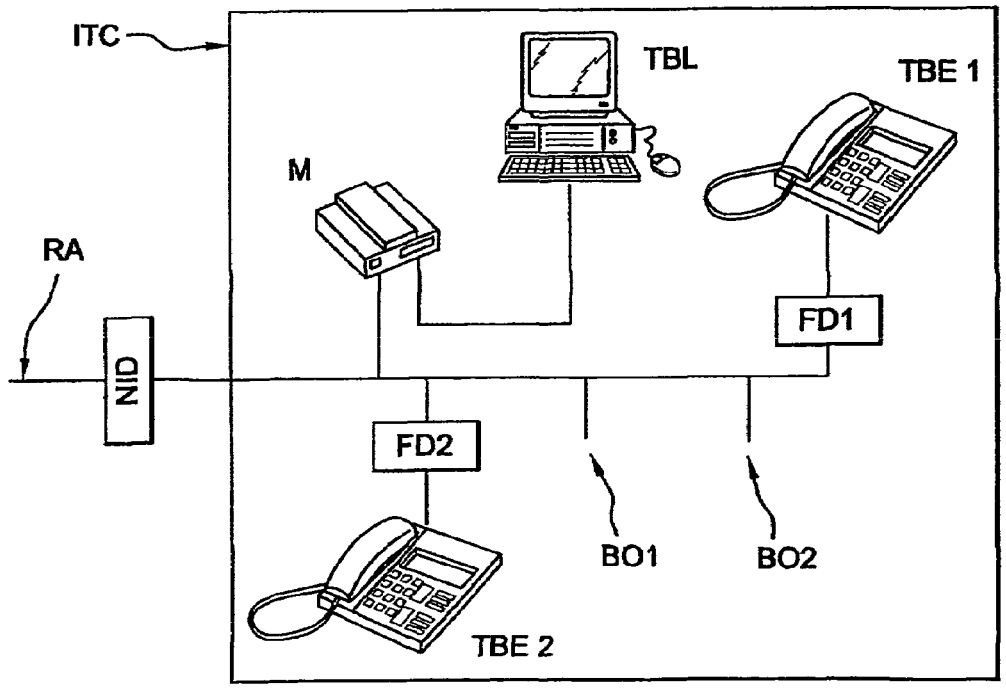
FIG. 2, already described, is a diagram of a prior art copper-wired terminal installation including distributed filters.
Figures 3, 4:
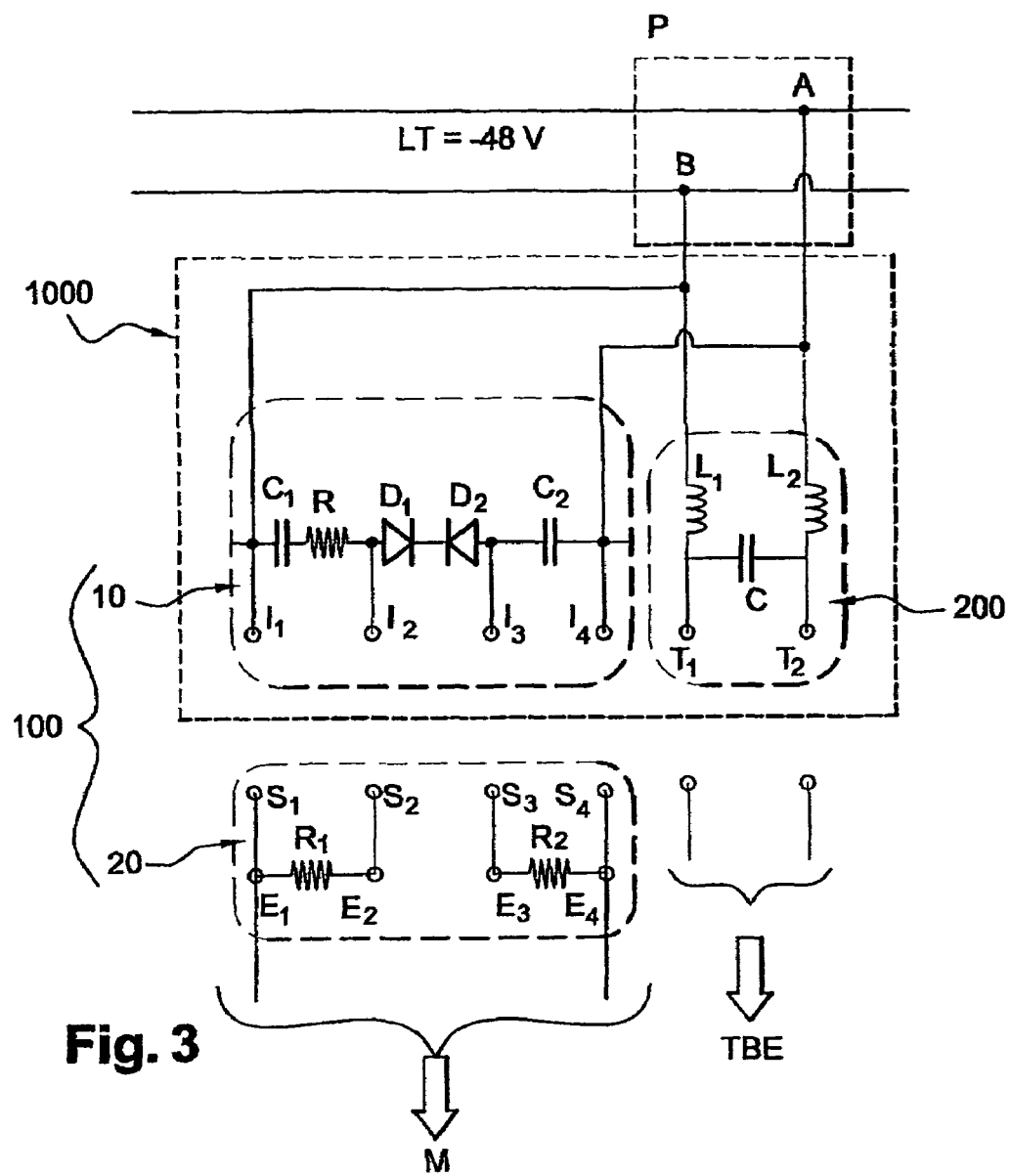
FIG. 3 is a diagram of an impedance matcher of the invention.
FIG. 4 is a diagram of the FIG. 3 impedance matcher in a separated configuration.

FIG. 3 is a diagram of an impedance matcher 100 for matching the impedance of a high bit rate transmission channel of a copper-wired terminal installation. It comprises two separate modules 10 and 20 for automatically inserting a different impedance value into a jack P at the input of the access network according to whether or not a high bit rate modem M is connected to the jack P.

The telephone line LT carries narrowband services and broadband services at the same time and is conventionally at a voltage of −48 V.

The first module 10 is an adjustment module installed in the jack P that inserts a terminating impedance of finite value into the jack P.

The second module 20 is a coupling module that is preferably connected to the high bit rate modem, for example fixed to the plug for connecting the modem. This module is designed to be combined with the adjustment module 10 when the modem is plugged into the jack P. The combination of the two modules automatically modifies the value of the impedance inserted into the jack P to make the jack transparent to high bit rate transmission in the frequency band from 3 to 12 MHz.

The impedance matcher includes compact low-cost passive components. Its small overall size enables it to be housed in the same casing 100 as a distributed filter 200.

The distributed filter 200 masks the impedance of the narrowband terminal TBE, the capacitive load of which compromises the quality of the broadband transmission channel. It conventionally comprises an LC circuit.

The impedance matcher is connected to the jack P, preferably in parallel with the distributed filter 200 housed in the same casing 1000.

Inserting a terminating impedance into the telephone jack P prevents impedance variations otherwise liable to occur on the telephone line LT in the 3-12 MHz band because of the presence of open branches and/or capacitive loads in the private installation.

As shown in FIG. 4, the adjustment module 10 introduces this terminating impedance into the jack P.

To this end, the module takes the form of an RC circuit. To be more precise, the RC circuit comprises a resistor R, capacitors C1, C2 and variable capacitance diodes D1, D2 (also known as varicap diodes or varactors). All these components are connected in series.

Reverse-biased varicap diodes present capacitance that is variable. Their capacitance decreases as the reverse bias voltage increases. The diodes D1 and D2 present capacitance that can vary from a few picofarads (pF) to a few hundred pF, depending on the applied voltage.

In the FIG. 4 example, there are two of these diodes. A device with more than two varicap diodes may nevertheless be envisaged, provided that the number of diodes is even.

Finally, as described in more detail below with reference to FIG. 5, the diodes are disposed head-to-tail in order to reverse-bias one of the two diodes regardless of the polarity of-the telephone line. The two diodes may be connected anode-to-anode or cathode-to-cathode. In the configuration represented in FIG. 4, in which the matcher is separate and only the adjustment module is installed in the jack, the diodes D1 and D2 are not reverse-biased because they are isolated by the capacitors C1 and C2 on either side.

In this case, the device as a whole presents impedance equal to the resistance of the resistor R, and preferably of the order of 135 106 in the 3-12 MHz band, this impedance value corresponding to the mean value of the impedance of the cable constituting the telephone line in this band of frequencies. The values of the components are carefully calculated and selected to obtain this impedance. For example, each of the capacitors C1 and C2 has a capacitance of 100 nF and the resistor R has a resistance of 135 Ω.

Figure 5:
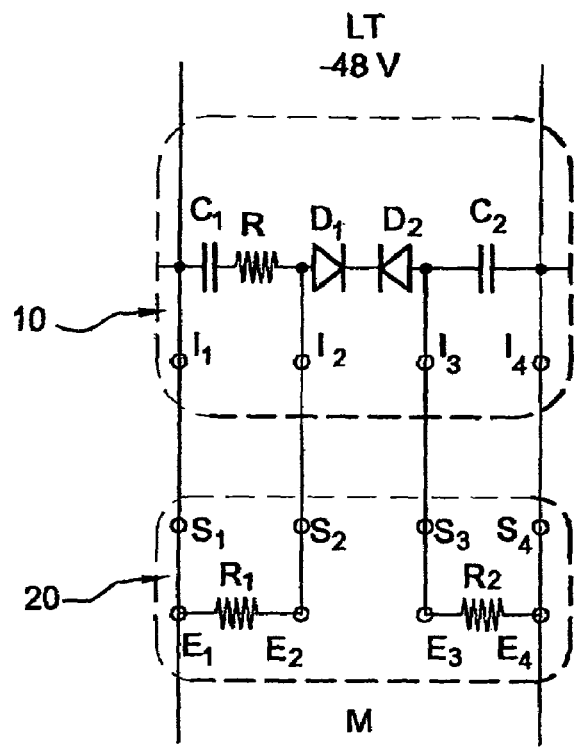
FIG. 5 is a diagram of the FIG. 3 impedance matcher in a combined configuration.

FIG. 5 is a diagram of the impedance matcher in a combined configuration, i.e. with the adjustment module 10 and coupling module 20 combined. A high bit rate modem M into the plug of which the coupling module 20 is inserted is connected to the installation via a jack into which the adjustment module 10 has been inserted. Accordingly, when the modem is plugged into the jack, the modules 10 and 20 are combined and co-operate so as automatically to transform the impedance inserted into the jack so that it is transparent to high bit rate transmission in the 3-12 MHz band.

The coupling module has four contacts E1, S1; E2, S2; E3, S3; E4, S4. Two of these contacts, E1, S1 and E4, S4, are used for the connection to the modem M. The other two contacts E2, S2 and E3, S3 are used to bias the varicap diodes D1 and D2 of the adjustment module via resistors R1 and R2.

Connecting the resistor R1 in parallel with the capacitor C1 of the adjustment module and the resistor R2 in parallel with the capacitor C2 of the adjustment module neutralizes the capacitors C1 and C2, modifies the supply voltage of the varicap diodes D1, D2 and reverse biases at least one of them from the −48 V supply voltage on the telephone line LT.

The diodes are connected head-to-tail, so that one of them has a very low junction capacitance relative to the other. This low junction capacitance of either the diode D1 or the diode D2, according to how they are biased, produces an infinite impedance, typically of the order of 1 kΩ to 10 MΩ.

Either or both of the resistors R1 and R2 presents very high resistance, typically from 2 MΩ to 5 MΩ, for example of the order of 2.2 MΩ, in order to draw an infinitesimal current and for the resultant impedance of the device not to be modified. The two resistors R1 and R2 may be of equal value to render the circuit symmetrical, for example.

In the proposed embodiment, the component values are calculated to address mismatch problems in the 3-12 MHz band. The choice of varicap diodes is important because it determines limit values for the variable impedance. The best ratio of the capacitances, in a proportion of 1 to 30, is obtained with BB132 diodes, which are available off the shelf. Using six diodes, for example, a capacitance is obtained that varies from 450 pF (with a bias voltage=0) to 16.5 pF (with a bias voltage of −28 V), which gives cut-off frequencies of approximately 3 MHz and approximately 80 MHz, respectively.

Beyond 10 MHz, the impedance of the matcher is limited by that of the distributed filter or the parallel-connected filters in the ITC if the filter(s) are not adapted to VDSL transmission.

Figure 6:
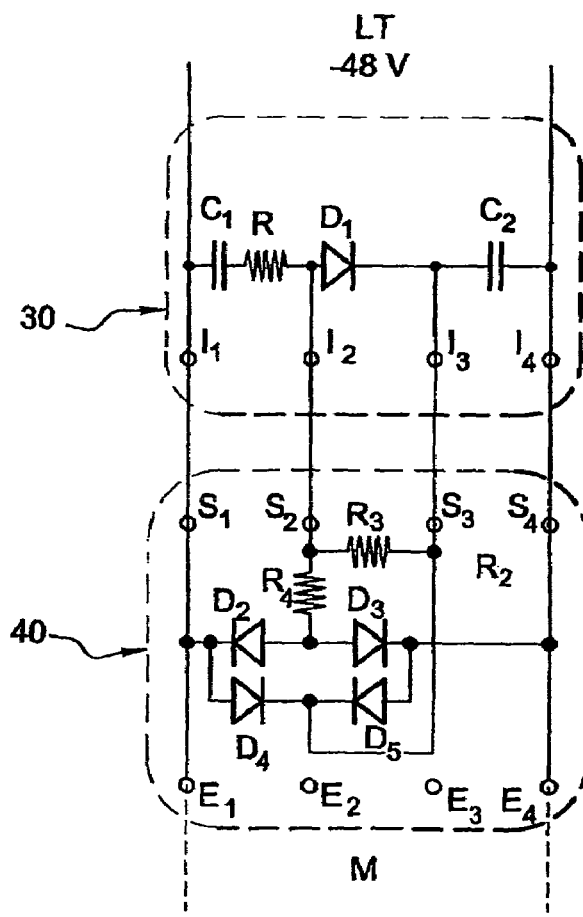
FIG. 6 is a diagram of a second embodiment of an impedance matcher in a combined configuration.

FIG. 6 shows a second embodiment of an impedance matcher for a high bit rate transmission channel of a copper-wired terminal installation. In this circuit, the adjustment module 30 includes only one varicap diode D1. If only the adjustment module is installed in a jack, the diode D1 is not reverse-biased because it is isolated by the capacitors C1 and C2 on either side. In this case, the adjustment module has an impedance equal to the resistance of the resistor R, and preferably of the order of 135 Ω in the 3-12 MHz band, as explained above with reference to FIG. 4.

In this embodiment, the coupling module 40 is designed to be combined with the adjustment module 30 when a high bit rate modem M is plugged into the jack and is slightly more complex than that of the first embodiment. The coupling module 40 still includes four contacts E1, S1; E2, S2; E3, S3; E4, S4; two of these contacts, E1, S1 and E4, S4, are used for the connection to the modem M. The other two contacts E2, S2 and E3, S3 are used to reverse-bias the varicap diode D1 of the adjustment module by means of a rectifier bridge in the coupling module 40 and a resistor bridge R3, R4. The rectifier bridge consists of rectifier diodes D2, D3, D4 connected two by two in parallel and head-to-tail. The rectifier bridge in the coupling module modifies the supply voltage of the varicap diode D1 and reverse-biases it from the −48 V supply voltage on the telephone line to obtain an infinite impedance, typically from 1 kΩ to 10 MΩ.

The resistors R3 and R4 forming the resistor bridge preferably each have a high value, typically from 2 MΩ to 5 MΩ, for example of the order of 5 MΩ, so that an infinitesimal current is drawn and the impedance of the device is not modified.

The impedance matcher has been evaluated by measuring the bit rate on the line in both transmission directions on a VDSL link. These tests measured the impact in the 3-12 MHz band of open branches and/or capacitive loads with and without the impedance matcher. This also verified the transparency of the matcher to high bit rate transmission.

Figure 7:
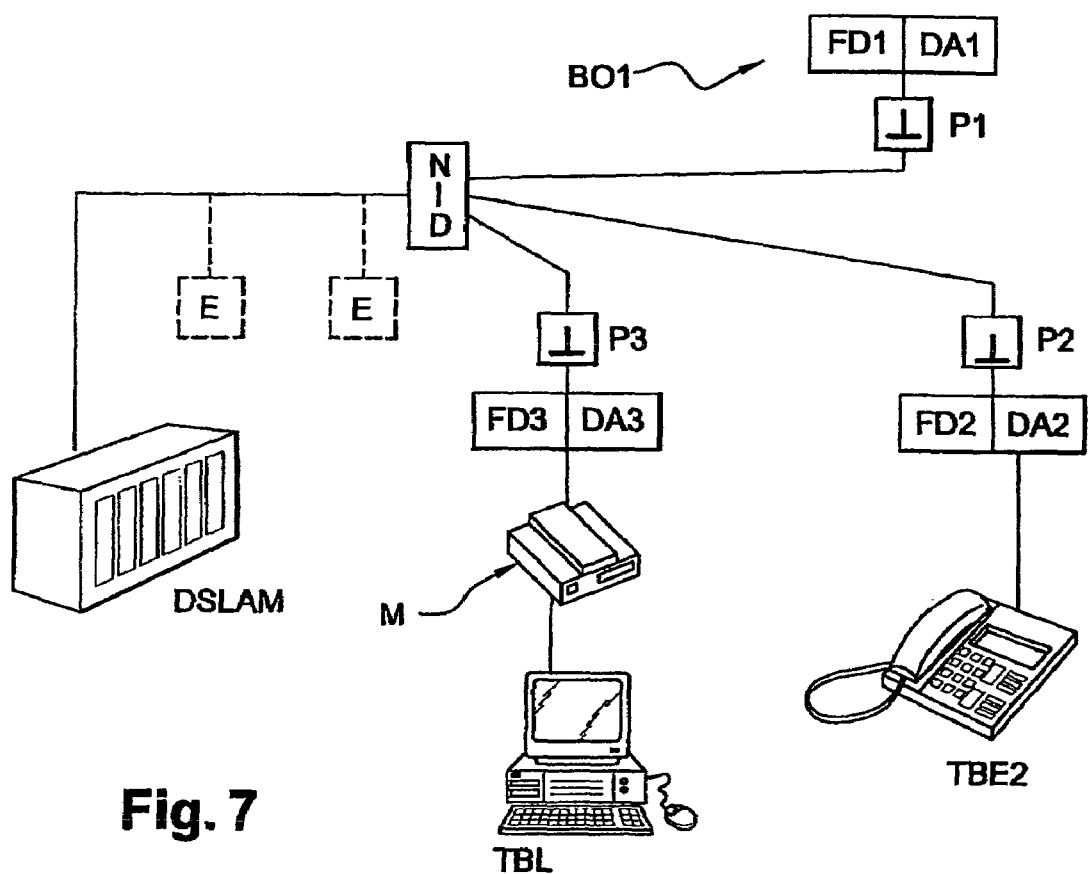
FIG. 7 is a diagram of a private installation in which bit rates on the line are measured with and without the FIG. 3 impedance matcher.

FIG. 7 shows the copper-wired terminal installation in which the evaluation was carried out. This private installation begins at the network interface device (NID). The VDSL connection comprises an exchange-side equipment (DSLAM) with an integrated low-pass filter, 600 meters (m) of cable and a VDSL modem M in the private portion. The ITC comprises three jacks P1, P2, P3 connected to the access network with a star topology (6 m spurs).

As shown in FIG. 7, the jacks P1 to P3 all comprise distributed plug-in filters FD1 to FD3 for the connection of the terminals TBE2 in the voice band and matchers DA1 to DA3 for the VDSL modems M or the open branches BO1 and/or capacitive branches TBE2. A VDSL modem M is connected to the third jack P3.

The in-line bit rates were measured by the proprietary system manager for a system noise margin of 6 decibels (dB).

The table below summarizes the results obtained on a VDSL connection including matched and non-matched open branches.

|  | Line bit rate (Mbit/s) | |
| --- | --- | --- |
| Type of connection | Downlink channel | Uplink channel |
| With no open branches | 27.72 | 7.93 |
| With non-matched open branches | 13.56 | 1.92 |
| With matched open branches | 15.23 | 5.24 |

In the presence of noise E (exchange side noise and installation side normalized noise FFTExc), it is the uplink channel that is primarily affected and which therefore limits the performance of the VDSL connection.

Mismatches relative to the ITC (open branches, capacitive branches) and the topology thereof (star, bridge or parallel) must be taken into account to the extent that they are cumulative with crosstalk noise on the line.

It is preferable for there to be terminating impedances on open branches of the copper-wired terminal installation (ITC). The performance of a 600 m VDSL connection with two 6 m open and/or capacitive branches at the line end is degraded. By comparison, when the matcher is inserted at the end of each branch, the line bit rates are improved in both transmission directions, especially in the uplink direction.

The impedance matcher is also transparent to high bit rate transmission.

The line bit rates on a VDSL connection are significantly improved by matching the open branches to an impedance of 135 Ω in the 3-12 MHz band.

Finally, the impedance matcher is made from low-cost components and can easily be integrated into the same casing as a distributed filter.

The invention claimed is:

1. An impedance matcher for matching impedance of at least one high bit rate transmission channel of a copper-wired terminal installation connected to an access network delivering narrowband services and broadband services, said installation comprising a high bit rate x-DSL modem and a jack, said impedance matcher comprising:
   an adjustment module installed in said jack, said adjustment module comprising an RC circuit and being configured to insert a terminating impedance into said jack when said jack is not connected to said high bit rate x-DSL modem; and
   a coupling module connected to the high bit rate x-DSL modem, said coupling module comprising a first resistor configured for connection in parallel with a capacitor of the adjustment module to reverse-bias a varicap diode of the adjustment module, said coupling module being configured for combination with said adjustment module when said high bit rate x-DSL modem is connected to said jack to transform the impedance inserted into said jack.

2. The impedance matcher according to claim 1, wherein the RC circuit of the adjustment module comprises, in series, a second resistor, the capacitor, and the varicap diode.

3. The impedance matcher according to claim 1, further comprising a distributed filter connected in parallel with the adjustment module.

4. The impedance matcher according to claim 3, wherein the adjustment module comprises an even number of varicap diodes.

5. The impedance matcher according to claim 4, wherein the varicap diodes are disposed in a head-to-tail manner.

6. The impedance matcher according to claim 1, wherein the coupling module includes a rectifier bridge comprising rectifier diodes and a resistor bridge.

7. The impedance matcher according to claim 1, wherein the first resistor has a value from 2 MΩ to 5 MΩ.

8. The impedance matcher according to claim 1, wherein the high bit rate x-DSL modem is a VDSL modem.

9. A copper-plated terminal installation connected to an access network carrying narrowband services and broadband services comprising the jack and the high bit rate x-DSL modem, wherein the copper-plated terminal installation includes impedance matchers according to claim 1.

10. An installation according to claim 9, wherein the impedance matchers each comprise two modules configured for combination with each other when the high bit rate x-DSL modem is connected to the jack, a first module being installed in said jack at an access point to the network and the second module being disposed in a plug for connecting the high bit rate x-DSL modem.

11. A method of matching impedance of a high bit rate transmission channel of a copper-wired terminal installation connected to an access network delivering narrowband services and broadband services, said installation comprising a high bit rate modem and a jack, the method comprising the steps of:
   inserting, via an adjustment module, a terminating impedance into said jack when said jack is not connected to said high bit rate modem to adjust impedance of the jack; and
   transforming, via a coupling module connected to the high bit rate modem, the terminating impedance inserted into said jack when said high bit rate modem is connected to said jack;
   wherein the coupling modem comprises a first resistor configured for connection in parallel with a capacitor of the adjustment module to reverse-bias a varicap diode of the adjustment module, said coupling module being configured for combination with said adjustment module when said high bit rate modem is connected to said jack.

12. An impedance matcher for matching impedance of a high bit rate transmission channel of a copper-wired terminal installation connected to an access network delivering narrowband services and broadband services, said installation comprising a high bit rate modem, and a jack, the impedance matcher comprising:
   an adjustment module installed in said jack, said adjustment module being configured to insert a terminating impedance into said jack when said jack is not connected to said high bit rate modem; and
   a coupling module connected to the high bit rate modem, said coupling modem comprising a resistor configured for connection in parallel with a capacitor of the adjustment module to reverse-bias a varicap diode of the adjustment module, said coupling module being configured for combination with said adjustment module when said high bit rate modem is connected to said jack to transform the impedance inserted into said jack.

13. A copper-plated terminal installation connected to an access network carrying narrowband services and broadband services comprising a jack and a high bit rate modem, wherein the copper-plated terminal installation includes impedance matchers comprising:

an adjustment module installed in said jack, said adjustment module being configured to insert a terminating impedance into said jack when said jack is not connected to said high bit rate modem; and a coupling module connected to the high bit rate modem, said coupling module comprising a resistor configured for connection in parallel with a capacitor of the adjustment module to reverse-bias a varicap diode of the adjustment module, said coupling module being configured for combination with said adjustment module when said high bit rate modem is connected to said jack to transform the impedance inserted into said jack.

* * * * *